April 21, 1936.　　　　O. H. DICKE　　　　2,037,767
HEAT REGULATOR
Original Filed April 2, 1930
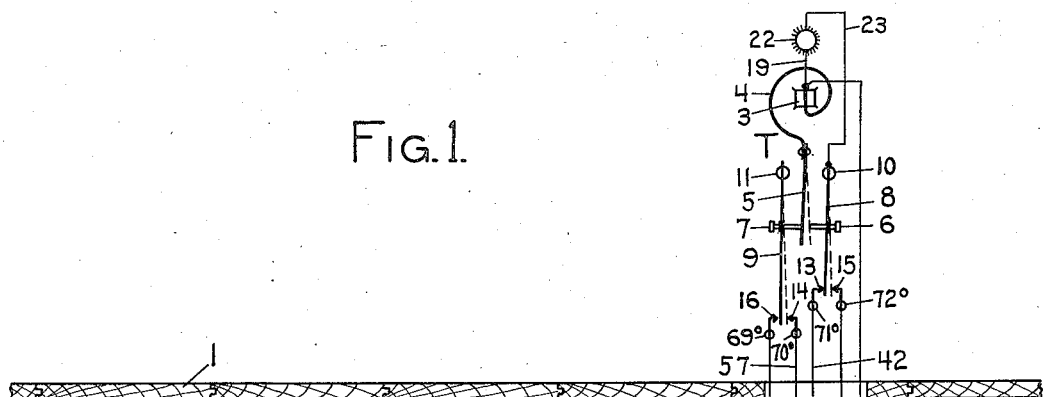
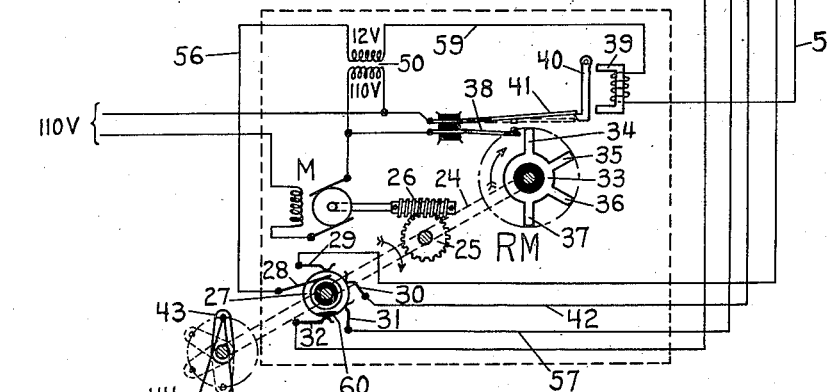
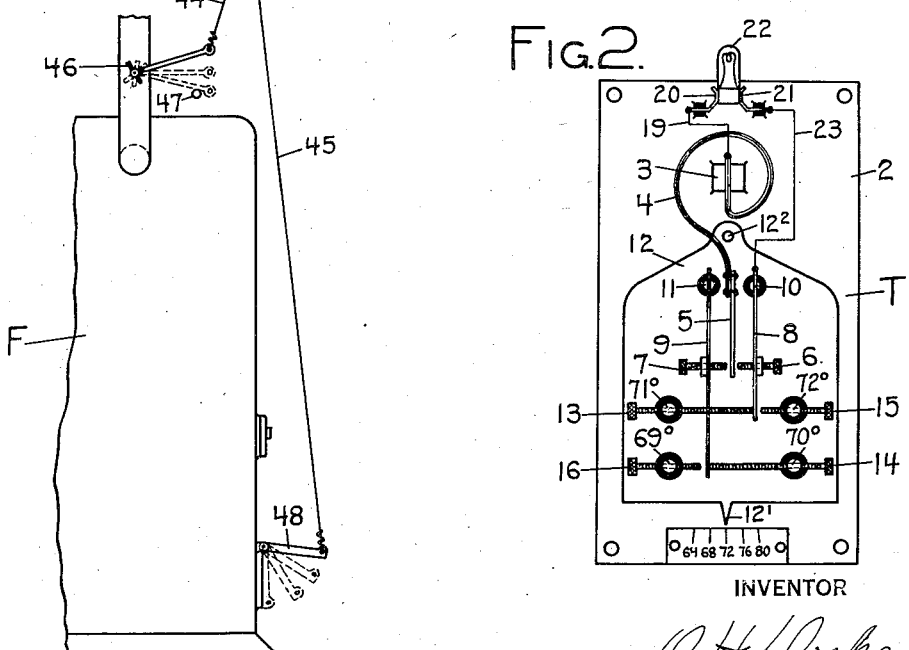
INVENTOR
O. H. Dicke Patented Apr. 21, 1936

2,037,767

UNITED STATES PATENT OFFICE 2,037,767

HEAT REGULATOR

Oscar H. Dicke, Rochester, N. Y., assignor to Pioneer Heat Regulator Corporation, a corporation of New Jersey Application April 2, 1930, Serial No. 441,108
Renewed April 18, 1934

20 Claims. (Cl. 236—76)

This invention relates to heat regulators for controlling dampers or other heat control devices of a furnace, including the provision of a frictionless circuit controlling thermostat for closing any one of three or more circuits independently, and without the employment of wipe contacts, for controlling the supply of heat delivered by a heat supply source such as a solid, liquid, or gaseous fuel furnace.

Said thermostat controls a "furnace regulating machine", viz., a power driven device for controlling the dampers or fuel feed devices of a furnace, which machine is controlled electrically and automatically comes to a stop when the desired control has been accomplished. In accordance with the embodiment of the present invention herein disclosed as illustrative, two double-throw spring members biased toward each other and in engagement with stationary contacts are adapted to be alternatively engaged by a thermally actuated conducting member and are adapted to be moved away from said contacts into engagement with other stationary contacts, whereby a circuit may be established from said thermally actuated conducting member to any one of four stationary contacts.

Thermostatically controlled heat regulating devices of usual construction provide for only a two position control of the heat supply—maximum and minimum. This causes rather drastic changes in the temperature of the furnace and connected apparatus. An object of the present invention is to provide a heat supply regulating device whereby the regulating device is adjusted to one of three or more positions, depending upon the temperature at the time in the apartment being heated.

A further object is to provide such a heat supply regulating system controlled by a thermostat so constructed that the system may be controlled to one of three or more positions with the minimum of work and movement and without the use of wiping contacts.

Other objects, purposes and characteristic features of the present invention will in part be apparent from the accompanying drawing and will in part be more specifically pointed out hereinafter.

In describing the invention in detail reference will be made to the accompanying drawing in which:—

Fig. 1 shows a four position furnace regulating system embodying the present invention; and Fig. 2 shows in greater detail the construction of the thermostat shown conventionally in Fig. 1.

Structure.—Referring to Fig. 1 there is shown a floor 1 separating the living room from the basement of a dwelling, in the living room of which is shown a thermostat T, and in the basement of which is shown a furnace F controlled by the regulating motor RM confined within a casing illustrated by the rectangle. The thermostat T (as shown in Figure 2) comprises a back plate 2 on which is mounted a stationary post 3 having a spirally bent bi-metallic thermostat element 4 supported thereby. To this thermostat element 4 is riveted a contact arm 5, which is adapted to engage one or the other of adjustable contacts 6 and 7, adjustably secured in the contact springs 8 and 9, respectively. These contact springs 8 and 9 are supported by insulated studs 10 and 11 supported by the movable plate 12 pivotally supported at 12², and are biased toward each other, the spring 8 normally engaging a stationary adjustable contact 13 and the spring 9 normally engaging the stationary adjustable contact 14, from which it appears that current may be supplied to the stationary contact 14 when the contact blade 5 moves toward the left and current may be supplied to the stationary contact 13 when the movable contact 5 moves toward the right.

Upon further movement of the contact blade 5 to the right, for instance, it will effect movement of the contact blade 8 away from the contact 13 and into engagement with the stationary adjustable contact 15, and similarly further movement of the contact blade 5 toward the left will move the blade 9 from engagement with the contact 14 and into engagement with the stationary contact 16, all of these adjustable contacts 13, 14, 15 and 16 being threaded into posts fastened to but insulated from the plate 12, which posts for convenience have been designated 71°, 70°, 72° and 69°, respectively. The plate 12 may be shaped to form a pointer 12¹ which may be moved along the scale 64, 68, 72, 76 and 80, which designates the temperature at which the dwelling will be held by the heat regulating system embodying the present invention. As shown the furnace F will not be fully closed until the room temperature is 72 degrees.

At the top of the base plate 2 is shown a pilot light 22, preferably supported by spring clips 20 and 21 which are connected to the posts 3 and 10 by wires 19 and 23, respectively. From this it will appear that the pilot light 22 will be lighted so long as there is voltage between the posts 3 and 13 (71°), with the contact blade 5 out of engagement with the adjustable contact screw 6, but that movement of the contact blade 5 into engagement with the contact screw 6 will short circuit the pilot light 22 and cause operation of the heat regulating machine in a manner as more fully described hereinafter.

Referring now to the regulating motor RM, this mechanism may comprise a shaft 24, which is driven through suitable reduction gearing as gears 25 and 26 by a suitable motor M. This shaft 24 is provided with a commutator 27 which may consist of a sleeve of conducting material insulated from the shaft 24 but rotating therewith. A portion 60 of the periphery of said commutator is formed of non-conducting material. Brushes 28, 29, 30, 31, and 32 cooperate with said commutator—29, 30, 31, and 32 bearing upon said periphery and brush 28 bearing against the side thereof or upon a shoulder so that it is continually in contact. The shaft 24 is also provided with a spider 33 having radially projecting arms 34, 35, 36 and 37, which arms 34, 35, 36 and 37 are adapted to engage or otherwise actuate the spring contact 38 of a snap action circuit controlling mechanism including the electro-magnet 39, armature 40 and a latched spring contact 41. The shaft 24 may also be provided with one or more cranks 43, which through suitable mechanism such as chains 44 and 45 are adapted to control the fuel valves or the dampers of the furnace F. In the particular arrangement shown, the chain 44 controls the butterfly valve 46 in the smoke pipe between the medium and the full open position of the regulating motor RM, this butterfly valve 46 being arrested by a stop 47, and the chain 45 controls the draft door 48 of the furnace to four different positions. It should be understood that where the shaft 24 is to operate fuel valves, this may be accomplished by direct action and without the use of the crank 43.

*Operation.*—Referring to Fig. 2 of the drawing, it will be noted that movement of the contact blade 5 from its extreme left hand position to its extreme right hand position permits current to flow from this contact blade 5 to the contact post in the order of 69°, 70°, 71° and 72°, and these numbers are to signify the temperatures at which these various branch circuits are established or broken, as the case may be, with the adjustable back plate 12 assuming the 72 degree position on the scale illustrated. As shown by the thermostat in Fig. 2, the temperature is somewhere between 70 and 71 degrees, but as illustrated in Fig. 1 the existing temperature is between 69 and 70 degrees, in that the contact blade 9 in Fig. 1 assumes a position intermediate to the contacts on posts 69° and 70°.

Attention is directed to the fact that motor control contacts 38 and 41 are open, thus including the primary winding of the transformer 50 in series with the motor M, and since the motor impedance is very low as compared with the transformer impedance, substantially full voltage is applied to the transformer 50, and the secondary winding of this transformer 50 supplies a voltage of substantially its normal voltage. The transformer 50 is connected in series with the trip magnet 39, so that the magnet 39 may be controlled in accordance with the position assumed by the commutator 27 and the position assumed by the thermal element 4 of the thermostat T.

Let us now assume that the temperature of the dwelling rises and the thermostat element 4 moves the contact blade 5 toward the right, thereby allowing the blade 9 to engage the post 70°. This establishes the following circuit for energizing the trip magnet 39:—beginning at the secondary winding of the transformer 50, wire 56, brush 28, commutator 27, brush 31, wire 57, contact post 70°, contact spring 9, adjustable screw 7, contact blade 5, thermal element 4, wire 58, electromagnet 39, wire 59, back to the transformer 50. The completion of this circuit attracts the armature 40 and allows the contact spring 41 to engage the contact spring 38, thereby short circuiting the primary winding of transformer 50 and energizing the motor M which operates the shaft 24 in a clock-wise direction as indicated by the arrow.

The motor M will continue to operate and drive the shaft 24 until it has rotated through an angle of substantially 180 degrees, at which point the arm 37 of the spider 33 lifts the contact springs 38 and 41 to their raised positions, where the latch armature 40 will latch the spring finger 41 in its normal position (the transformer 50 being short circuited). As soon as the spring finger 38 slips off of the arm 37 the primary winding of the transformer 50 is reinserted in series with the motor M. This will produce a voltage on the secondary side of the transformer 50 which will actuate the electromagnet 39 through a circuit including the brushes 28 and 31, thereby again releasing the contact spring 41 and reclosing the motor circuit to allow continuation of the operation of the regulating machine. The same thing is repeated when the shaft 24 has rotated another angle of substantially 60 degrees, at which time the arm 36 of the spider 33 will momentarily break the motor circuit. When, however, the arm 35 reaches the relatching position of the contact spring 41, the insulated portion 60 of the commutator 27 will be under the brush 31, so that the circuit through the electromagnet 39 is not completed and the motor is stopped in this position of the shaft 24, at which time the damper 48 is only three-fourths open and the butterfly valve 46 is half closed.

It is clear that if any one of the brushes 29, 30, 31 or 32 is through its respective conductor and respective contact 15, 13, 14 or 16 brought into electric connection with the conductor 58 which leads to the releasing magnet 39 (which magnet is connected to the opposite side of the transformer 50) the motor M (unless the shaft 24 is already in the position of adjustment called for) will rotate the shaft 24 until the insulating segment 60 moves under the selected brush. The shaft will remain in the said position until another brush is connected with the wire 58. It will be noted that only one of the brushes 29, 30, 31 or 32 may be connected with the conductor 58 at any one time (as otherwise the motor will continue to run indefinitely) and that the thermostat illustrated is so constructed that only one such circuit can be effected at any one time.

Hereinabove, I described an operation initiated by connecting the brush 31 with the conductor 58 (through contact 14 or 70°), which operation was terminated when the switch 38—41 was opened while insulator 60 was located under said brush 31. It will be noted that with the shaft 24 in that position the pilot light 22 is still energized through the following circuit:—beginning at the secondary winding of transformer 50, wire 59, electromagnet 39, wires 58 and 19 to clip 20, pilot light 22, clip 21, wire 23, contact blade 8, post 71°, wire 42, brushes 31 and 28, wire 56, back to the transformer 50. Movement of the arm 5 of the thermostat T toward the right in response to a rise in room temperature, will short circuit this pilot light 22. In this connection it may be stated that the pilot light 22 is of such high resistance that the electromagnet 39 will not be operated when the lamp 22 is connected in series therewith, but that the electromagnet 39 is operated as soon as this pilot light 22 is short-circuited. In other words, the pilot light is extinguished when the temperature is 71 degrees or higher, under which condition the furnace is either one-fourth open or fully closed, and this pilot light 22 is illuminated when the temperature is below 71 degrees at which time the furnace is either three-fourths or fully open. The short-circuiting of the pilot light 22 of course unlatches the armature 40 from the contact spring 41, thereby reclosing the motor circuit and allowing the motor to operate until the insulated portion 60 of the commutator is under the brush 30.

The principal advantage of the thermostat illustrated in Fig. 2 resides in the construction and arrangement of parts whereby four independent circuits may be closed in non-overlapped relation, that is, no two of the circuits can be closed at one time, and this is accomplished by the direct engagement or separation of movable contacts moved toward and away, respectively, from stationary adjustable contacts. In other words, four independent circuits may be completed sequentially during a change in temperature, without the employment of a wipe contact, which would introduce a large and variable frictional resistance so that the temperatures at which circuits are made and broken would be very indefinite and variable. In the arrangement shown, the spring contact fingers 8 and 9 are preferably made of very thin spring metal and are biased toward each other and against the stationary contacts 13 and 14, respectively, with a spring tension just sufficient to make a reliable contact therewith, so that the force that must be exerted by the thermal element 4 to move these contacts in engagement with the contacts 15 and 16, respectively, is very small. It is of course understood that by eliminating the connection from the contact 13 or the contact 14 a three-position system is provided and also that the number of circuits may be extended from four circuits to any greater number of circuits by a further application of the same principle. Also that these circuits may have lamps included therein to indicate temperatures at a distant point.

Having thus shown and described a heat regulating system adapted to operate the dampers of a furnace, or the fuel control devices, to four different positions by a thermal operated circuit controller which is constructed so that the thermal element need only overcome spring tension rather than frictional opposition in establishing the necessary circuits to control the regulating machine to its various positions, it is desired to be understood that the particular structure shown is merely an exemplification of applicant's invention; and it is further desired to be understood that the particular arrangement illustrated is not necessarily the exact construction preferably employed in practicing the invention and is not to be considered as limiting the scope of the invention, and that various changes modifications and additions may be made to adapt the invention to the particular problem encountered in practicing the same, all without departing from the spirit or scope of the invention, except as demanded by the scope of the following claims.

What I claim as new is:—

1. A heat regulating system comprising a furnace regulating machine having three control circuits for controlling the heat flow of a furnace to three different extents in accordance with the particular one of its control circuits closed at the time, and a circuit selecting thermostat for controlling said regulating machine including a double throw contact member, a thermoresponsive contact arm, and three stationary contacts, said double throw contact member being biased against the first stationary contact and when moved from its biased position engaging the second stationary contact, and said thermoresponsive contact arm being arranged to engage and operate said double throw contact member from the first stationary contact into engagement with the second stationary contact and also arranged to effect the completion of a circuit through the third of said three stationary contacts, whereby any one of said three stationary contacts may be independently connected to a source of current by a direct contact engagement.

2. A heat regulating system comprising a furnace regulating machine having three control circuits for controlling the heat flow of a furnace to three different extents in accordance with the particular one of its control circuits closed at the time, and a circuit selecting thermostat for controlling said regulating machine including a double throw contact member, a thermoresponsive contact arm arranged to actuate said member when moved in one direction and to effect the completion of a circuit through another member when moved in another direction.

3. A heat regulating system comprising a furnace regulating machine having three control circuits for controlling the heat flow of a furnace to three different extents in accordance with the particular one of its control circuits closed at the time, and a circuit selecting thermostat for controlling said regulating machine including a double throw contact member, a thermoresponsive arm so arranged that when in normal position none of the control circuits are closed but when moved in one direction from normal it will first cause one circuit to be closed by direct contact and upon further movement in the same direction said circuit will be broken and a second circuit established.

4. A heat regulating system comprising a furnace regulating machine having three control circuits for controlling the heat flow of a furnace to three different extents in accordance with the particular one of its control circuits closed at the time, and a circuit selecting thermostat for controlling said regulating machine including a double throw contact member, a thermoresponsive arm so arranged that when in normal position none of the control circuits are closed but when moved in one direction from normal it will first cause one circuit to be closed and upon further movement in the same direction said circuit will be broken and a second circuit established.

5. A heat regulating system comprising a furnace regulating machine having three control circuits for controlling the heat flow of a furnace to three different extents in accordance with the particular one of its control circuits closed at the time, and a circuit selecting thermostat for controlling said regulating machine including a double throw contact member, a thermoresponsive arm so arranged that when in normal position none of the control circuits are closed but when moved in one direction from normal it will first cause one circuit to be closed by direct contact and upon further movement in the same direction said circuit will be broken and a second circuit established, and when moved in the opposite direction from normal a third circuit will be established.

6. A heat regulating system comprising a furnace regulating machine having four control circuits for controlling the heat flow of a furnace to four different extents in accordance with the particular one of its control circuits closed at the time, and a circuit selecting thermostat for controlling said regulating machine including two double throw contact members, a thermoresponsive contact arm, and four stationary contacts, each of said double throw contact members being biased against a stationary contact and when moved from its biased position engaging a second stationary contact, and said thermoresponsive contact arm being arranged to engage and operate both said double throw contact members from one of their respective stationary contacts into engagement with the other of their respective stationary contacts.

7. A heat regulating system comprising a furnace regulating machine having four control circuits for controlling the heat flow of a furnace to four different extents in accordance with the particular one of its control circuits closed at the time, and a circuit selecting thermostat for controlling said regulating machine including two double throw contact members, a thermoresponsive contact arm, and four stationary contacts, each of said double throw contact members being biased against a stationary contact and when moved from its biased position engaging a second stationary contact and said thermoresponsive contact arm being arranged when moved in one direction to operate one of said double throw contact members from its biased position into contact with its second contact.

8. A heat regulating system comprising a furnace regulating machine having four control circuits for controlling the heat flow of a furnace to four different extents in accordance with the particular one of its control circuits closed at the time, and a circuit selecting thermostat for controlling said regulating machine including two double throw contact members, a thermoresponsive contact arm, and four stationary contacts, each of said double throw contact members being biased against a stationary contact and when moved from its biased position engaging a second stationary contact and said thermoresponsive contact arm being arranged when moved in one direction to operate one of said double throw contact members from its biased position into contact with its second contact, and when moved in another direction to operate said other double throw contact member.

9. A heat regulating system comprising a furnace regulating machine having four control circuits for controlling the heat flow of a furnace to four different extents in accordance with the particular one of its control circuits closed at the time, and a circuit selecting thermostat for controlling said regulating machine including two double throw contact members, a thermoresponsive contact arm, and four stationary contacts, each of said double throw contact members being biased against a stationary contact and when moved from its biased position engaging a second stationary contact and said thermoresponsive contact arm being arranged when moved in one direction to operate one of said double throw contact members from its biased position into contact with its second contact, and when moved in another direction to operate said other double throw contact member from its biased position into contact with its second contact.

10. A heat regulating system comprising a furnace regulating machine having three or more control circuits for controlling the heat flow of a furnace to a corresponding number of different extents in accordance with the particular one of its control circuits closed at the time, and a circuit selecting thermostat for controlling said regulating machine including a double throw contact member, a thermoresponsive arm, said double throw contact member being biased against a stationary contact and when moved from its biased position engaging a second stationary contact, and said thermoresponsive arm being arranged to engage and operate said double throw contact member from the first stationary contact into engagement with the second stationary contact and also arranged to effect the completion of a circuit through the third of said three stationary contacts, whereby any one of said three stationary contacts may be independently connected to a source of current by a direct contact engagement.

11. In a heat regulating system, the combination with a furnace regulating machine having three control circuits and which will operate until it assumes a position where the energized control circuit is broken by a switch within the regulating machine, and a thermostat for energizing any one of said control circuits but only one at a time, comprising two movable contact arms one of which is arranged for engaging two stationary contacts independently and the other of which is adapted to engage a third contact, and thermoresponsive means for operating said movable contact arms.

12. In a heat regulating system, the combination with a furnace regulating machine having three control circuits and which will operate until it assumes a position where the energized control circuit is broken by a switch within the regulating machine, and a thermostat for energizing any one of said control circuits but only one at a time, comprising two movable contact arms one of which is arranged for engaging two stationary contacts independently and the other of which is adapted when moved in one direction to operate said other movable contact arm and when moved in the opposite direction to effect the completion of a circuit through another contact.

13. In a heat regulating system, the combination with a furnace regulating machine having three control circuits and which will operate until it assumes a position where the energized control circuit is broken by a switch within the regulating machine, and a thermostat for energizing any one of said control circuits but only one at a time, comprising two movable contact arms one of which is arranged for engaging two stationary contacts independently and the other of which is adapted when moved in one direction to operate said other movable contact arm and when moved in the opposite direction to effect the completion of a circuit through another contact, and thermoresponsive means for operating said contact arm.

14. In a heat regulating system, the combination with a furnace regulating machine having three or more control circuits and which will operate until it assumes a position where the energized control circuit is broken by a switch within the regulating machine, and a thermostat for energizing any one of said control circuits but only one at a time, comprising two movable contact arms one of which is arranged for engaging two stationary contacts independently and the other of which is adapted to engage a third contact, and thermoresponsive means for operating said movable contacts.

15. In a heat regulating system, the combination with a furnace regulating machine having three or more control circuits and which will operate until it assumes a position where the energized control circuit is broken by a switch within the regulating machine, and a thermostat for energizing any one of said control circuits but only one at a time, comprising two movable contact arms one of which is arranged for engaging two stationary contacts independently and the other of which is adapted when moved in one direction to operate said other movable contact arm and when moved in the opposite direction to effect the completion of a circuit through another contact.

16. In a heat regulating system, the combination with a furnace regulating machine having three or more control circuits and which will operate until it assumes a position where the energized control circuit is broken by a switch within the regulating machine, and a thermostat for energizing any one of said control circuits but only one at a time, comprising two movable contact arms one of which is arranged for engaging two stationary contacts independently and the other of which is adapted when moved in one direction to operate said other movable contact arm and when moved in the opposite direction to effect the completion of a circuit through another contact, and thermoresponsive means for operating said contact arm.

17. In a heat regulating system, the combination with a furnace regulating machine having four control circuits and which will operate until it assumes a position where the energized control circuit is broken by a switch within the regulating machine, and a thermostat for energizing any one of said control circuits but only one at a time, comprising two movable contact arms each of which is biased for engaging respectively two stationary contacts, and thermoresponsive operating means for operating said movable contact arms.

18. In a heat regulating system, the combination with a furnace regulating machine having four control circuits and which will operate until it assumes a position where the energized control circuit is broken by a switch within the regulating machine, and a thermostat for energizing any one of said control circuits but only one at a time, comprising two movable contact arms each of which is biased for engaging respectively two stationary contacts, and thermoresponsive operating means for operating said movable contact arms, said operating means being arranged to operate one of said contact arms when moved in one direction and to operate the other contact arm when moved in the other direction.

19. In a heat regulating system, the combination with a furnace regulating machine having four control circuits and which will operate until it assumes a position where the energized control circuit is broken by a switch within the regulating machine, and a thermostat for energizing any one of said control circuits but only one at a time, comprising two movable contact arms each of which is biased for engaging respectively two stationary contacts, and thermoresponsive operating means for operating said movable contact arms, said operating means comprising a conductive contact arm.

20. In a heat regulating system, the combination with a furnace regulating machine having four control circuits and which will operate until it assumes a position where the energized control circuit is broken by a switch within the regulating machine, and a thermostat for energizing any one of said control circuits but only one at a time, comprising two movable contact arms each of which is biased for engaging respectively two stationary contacts, and thermoresponsive operating means for operating said movable contact arms, said operating means being arranged to operate one of said contact arms when moved in one direction and to operate the other contact arm when moved in the other direction, said operating means comprising a conductive contact arm.

OSCAR H. DICKE.